UNITED STATES PATENT OFFICE.

WILHELM SCHRÖDER, OF WIEMELHAUSEN, GERMANY.

PROCESS OF MAKING YELLOW PRUSSIATE OF POTASH.

SPECIFICATION forming part of Letters Patent No. 624,383, dated May 2, 1899.

Application filed October 21, 1898. Serial No. 694,175. (No specimens.)

*To all whom it may concern:*

Be it known that I, WILHELM SCHRÖDER, a citizen of the Empire of Germany, residing at Wiemelhausen, near Bochum, in the Empire of Germany, have invented certain new and useful Improvements in Processes for Obtaining Yellow Prussiate of Potash in the Destructive Distillation of Coal, of which the following is a specification.

Analyses have shown that gaseous products of the distillation of coal after having been relieved of ammonia contain per cubic meter of gas 0.7 grams of prussic acid, (CNH,) which quantity, in case it can be utilized for the manufacture of yellow prussiate, corresponds to 1.82 grams of crystallized prussiate of potash, ($K_4Fe(CN)_6 3aq$.) Consequently with a plant yielding one hundred thousand cubic meters of gas per day the production of ferrocyanide would amount to one hundred and eighty-two kilograms per day or five thousand four hundred and sixty kilos per month, and the manufacture of prussiate of potash as a by-product of the destructive distillation of coal by means of an economical process is therefore a great desideratum. The following process has been found to answer this requirement:

To the water for the absorption of ammonia protochloride of iron ($FeCl_2$) is added before the absorption takes place. When the water takes up ammonia, ($NH_3$,) the protochloride of iron ($FeCl_2$) contained in the water forms, with the ammonia, ferrous hydrate, ($Fe(OH)_2$,) besides salammoniac, ($NH_4Cl$.) With the sulphureted hydrogen contained in the gas it forms ferrous sulphide, (FeS,) which, together with the ferrous hydrate mentioned above, is held in suspension by the absorption-water. At the same time the prussic acid combines with ammonia to form ammonium cyanide, ($NH_4CN$,) which then dissolves the suspended ferrous hydrate or ferrous sulphide, thereby forming ammonium ferrocyanide, ($(NH_4)_4Fe(CN)_6$. If now the ammonia is distilled off, as usual, with the aid of milk of lime, ($Ca(OH)_2$,) calcium ferrocyanide ($Ca_2Fe(CN)_6$) remains behind, and as the latter is sparingly soluble a portion of it is precipitated.

For recovering the portion which has remained in solution the gas already relieved of ammonia and prussic acid is led into the residue (of the distillation) containing the whole of the lime-mud in order that the carbonic acid contained in the gas may precipitate the excess of caustic lime in the shape of calcium carbonate, ($CaCO_3$.) If now a solution of ferric chloride ($Fe_2Cl_6$) be added, that portion of the calcium ferrocyanide which has remained in solution separates in the shape of Prussian blue, ($2Fe_2 3Fe(CN)_6$,) which rapidly forms a precipitate, together with the entire lime-mud. The whole of the precipitate is then treated with a solution of potassium carbonate ($K_2CO_3$) while boiling and stirring, whereby calcium carbonate ($CaCO_3$) and ferric hydrate ($Fe_2(OH)_6$) are precipitated and potassium ferrocyanide ($K_4Fe(CN)_6$) enters in solution. The solution thus obtained is boiled down until crystals of yellow prussiate of potash ($K_4Fe(CN)_6 3aq$) are formed.

Having thus described my invention, I claim as new and desire to secure by Letters Patent—

The herein-described process for the manufacture of yellow prussiate of potash, which consists in passing the gaseous product of the destructive distillation of coal through an aqueous solution of protochloride of iron, distilling said solution with milk of lime for precipitating calcium ferrocyanide, precipitating the excess of lime in the residual solution, then precipitating the calcium ferrocyanide remaining in the solution, treating the entire precipitate with a solution of potassium carbonate so as to precipitate calcium carbonate and ferric hydrate from said solution, and crystallizing the yellow prussiate of potash from the remaining solution, substantially as set forth.

In testimony that I claim the foregoing as my invention I have signed my name in presence of two subscribing witnesses.

WILHELM SCHRÖDER.

Witnesses:
CHAS. E. BARNES,
WILLIAM H. MADDEN.